United States Patent
Kutzehr et al.

(10) Patent No.: US 6,557,812 B2
(45) Date of Patent: May 6, 2003

(54) SWING-DOWN CEILING MOUNT FOR MOTOR-VEHICLE MIRROR OR MONITOR

(75) Inventors: Roland Kutzehr, Lüdenscheid (DE); Andreas Fallmann, Karlsfeld (DE); Mirko Gutbier, Lüdenscheid (DE)

(73) Assignees: Sarnatech & Crone GmbH, Ludenscheid (DE); Bayerische Motoren Werke AG, Munich (DE)

( * ) Notice: Subject to any disclaimer, the term of this patent is extended or adjusted under 35 U.S.C. 154(b) by 37 days.

(21) Appl. No.: 09/853,092

(22) Filed: May 10, 2001

(65) Prior Publication Data
US 2001/0050329 A1 Dec. 13, 2001

(30) Foreign Application Priority Data
May 11, 2000 (DE) .................... 200 08 498 U

(51) Int. Cl.$^7$ .................. B60R 1/02; B60J 3/00
(52) U.S. Cl. .................. 248/476; 248/480; 248/919; 248/276.1; 296/37.7; 296/97.8
(58) Field of Search .................. 248/476, 479, 248/480, 485, 487, 919, 920, 921, 276.1, 287.1, 183.2, 179.1; 359/607, 841; 296/97.11, 97.8, 37.7; 403/52, 53, 54, 80

(56) References Cited

U.S. PATENT DOCUMENTS

| | | | | |
|---|---|---|---|---|
| 1,567,480 A | * | 12/1925 | Wood | 296/97.11 |
| 1,635,367 A | * | 7/1927 | La Tourrette | 248/279.1 |
| 1,646,379 A | * | 10/1927 | Whitehead | 248/481 |
| 1,933,333 A | * | 10/1933 | Morgan | 359/527 |
| 2,134,414 A | * | 10/1938 | Norcross | 296/97.4 |
| 2,805,778 A | * | 9/1957 | Yordi | 108/44 |
| 2,894,576 A | * | 7/1959 | Williams | 160/220 |
| 3,071,408 A | * | 1/1963 | Turner | 296/97.6 |
| 3,306,657 A | * | 2/1967 | Turner | 296/97.6 |
| 3,853,370 A | * | 12/1974 | Barnhart | 296/97.6 |
| 4,824,159 A | * | 4/1989 | Fluharty et al. | 248/278.1 |
| 4,906,088 A | * | 3/1990 | Casey | 359/865 |
| 4,916,595 A | * | 4/1990 | Naruke et al. | 362/42 |
| 4,974,897 A | * | 12/1990 | Shirley | 296/97.1 |
| 5,015,027 A | * | 5/1991 | Rifaat | 296/97.6 |
| 5,039,153 A | * | 8/1991 | Lindberg et al. | 16/297 |
| 5,152,573 A | * | 10/1992 | Riera | 296/97.4 |
| 5,156,434 A | * | 10/1992 | Vandagriff | 296/97.12 |
| 5,261,717 A | * | 11/1993 | Tsumura et al. | 296/97.2 |
| 5,748,395 A | * | 5/1998 | Rendi, Jr. | 359/841 |
| 6,409,242 B1 | * | 6/2002 | Chang | 296/24.1 |
| 6,412,848 B1 | * | 7/2002 | Ceccanese et al. | 224/311 |

FOREIGN PATENT DOCUMENTS

JP        05330339 A  * 12/1993

* cited by examiner

Primary Examiner—Leslie A. Braun
Assistant Examiner—Naschica S. Morrison
(74) Attorney, Agent, or Firm—Herbert Dubno; Andrew Wilford

(57) ABSTRACT

A mount assembly for a flat mirror or monitor has an outer frame fixed in a motor-vehicle roof and forming an opening, a member forming a side of the opening and pivotal in the frame about a horizontal first axis, and an inner frame fittable in the opening adjacent the member and carrying the flat mirror or monitor. A connector is pivotal in the member about a second axis transverse to the first axis. A slide joint secures the connector to the inner frame for movement of the inner frame parallel to the transverse second axis on the connector. The slide joint includes a slot formed in the connector and a screw seated in the movable frame and extending transversely through the slot.

9 Claims, 4 Drawing Sheets

SWING-DOWN CEILING MOUNT FOR MOTOR-VEHICLE MIRROR OR MONITOR

SPECIFICATION

FIELD OF THE INVENTION

The present invention relates to a swing-down ceiling mount usable in a motor vehicle. More particularly this invention concerns such a mount used to hold a vanity mirror, flat-screen monitor, or the like.

BACKGROUND OF THE INVENTION

In order to mount a flat unit such as a vanity mirror or flat-screen monitor in a motor vehicle it is standard to secure it so it can be swung down from the roof, lying flush with the head liner when not in use. As a rule a simple pivot is provided so that the flat unit can be pivoted only about a horizontal axis extending perpendicular to the vehicle travel direction.

The problem with this is that it is often difficult for a person off to the side to use the mirror or get a straight-on view of the monitor, which latter is often mounted centrally. Thus a back-seat passenger is obligated to lean inward to see the monitor, even if there is no-one else viewing it. What is more, a person lying down in the back seat or inclined must deal with a perpendicular monitor, which can detract from viewing pleasure. Retrofitting such a system in a vehicle with a curved roof often requires that it be set offcenter in an inclined portion of the roof, so that when swung down it is not level.

OBJECTS OF THE INVENTION

It is therefore an object of the present invention to provide an improved mount for a flat unit such as a monitor or mirror.

Another object is the provision of such an improved mount for a flat unit such as a monitor or mirror which overcomes the above-given disadvantages, that is which allows the monitor or mirror to be set in any of a multiplicity of different orientations.

A further object is to provide an improved flat-unit mount which can be mounted in nonlevel roof regions and still sit level or at any desired angle.

SUMMARY OF THE INVENTION

A mount assembly for a flat mirror or monitor has according to the invention an outer frame fixed in a motor-vehicle roof and forming an opening, a member forming a side of the opening and pivotal in the frame about a horizontal first axis, and an inner frame fittable in the opening adjacent the member and carrying the flat mirror or monitor. A connector is pivotal in the member about a second axis transverse to the first axis. A slide joint secures the connector to the inner frame for movement of the inner frame parallel to the transverse second axis on the connector.

Thus with this system the flat unit—monitor or mirror— can be pivoted down, then pivoted about an upright axis to point it to either corner, and even slid up or down on the connector for best viewing angle. The orientation of the flat unit can therefore be adjusted for virtually any desired viewing angle or height.

The slide joint according to the invention includes a slot formed in the connector and extending parallel to the first axis and a screw seated in the movable frame and extending transversely through the slot. Edges of the slot are roughened for frictional engagement with a head of the screw. This makes it possible, when the inner frame has been pivoted down into a generally vertical position, to adjust the height of the inner frame and the mirror or monitor it carries.

The member in accordance with the invention is formed with a hole centered on the second axis and receiving a head of the connector. This hole can be a slot elongated parallel to the first axis and slidably receiving the connector so that the inner frame can move parallel to the first axis relative to the member and outer frame. Thus the entire inner frame can be pushed to one side or the other when, for instance, only one back-seat passenger wants to use the monitor or mirror.

The inner frame of the invention is formed with an edge notch through which the connector passes. In addition a pivot joint secures the connector to the inner frame for movement of the inner frame on the connector about a third axis transverse to the second axis and to a plane formed by the first and second axes. Thus, when mounted in an inclined part of the vehicle roof, the monitor can be set level. More particularly the pivot joint includes a transverse hole through the connector and a screw seated in the inner frame and extending along the third axis through the hole. The connector is formed with side edges and the inner mount has formations, e.g. unitary ribs or screwed-in stop bolts, engageable with the side edges for limiting pivoting of the inner frame about the third axis on the connector. In an embodiment the connector has a T-shaped part with arms forming the side edges. The T-shaped part is between the mirror or monitor and the inner frame.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
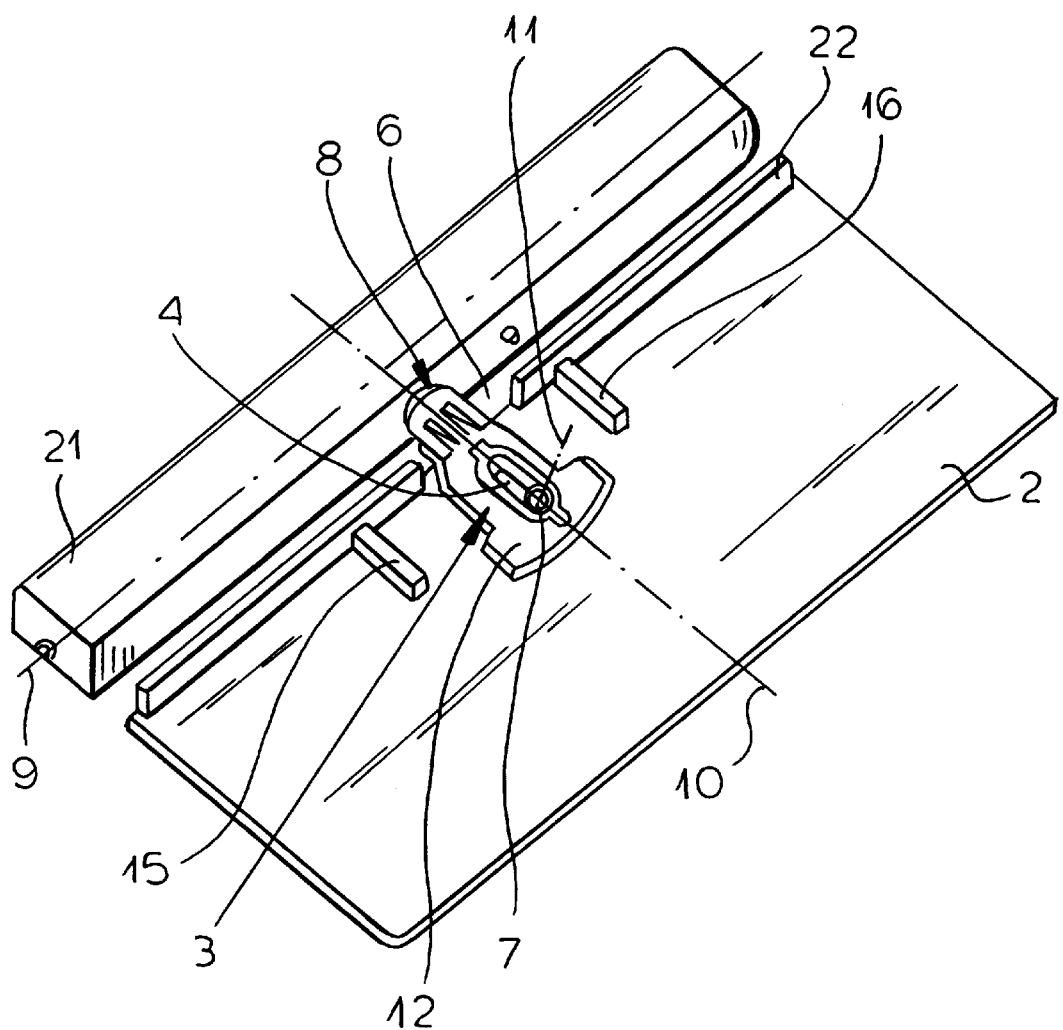
FIG. 1 is a perspective view of elements of the motor-vehicle ceiling mount according to the invention.
Figure 2:
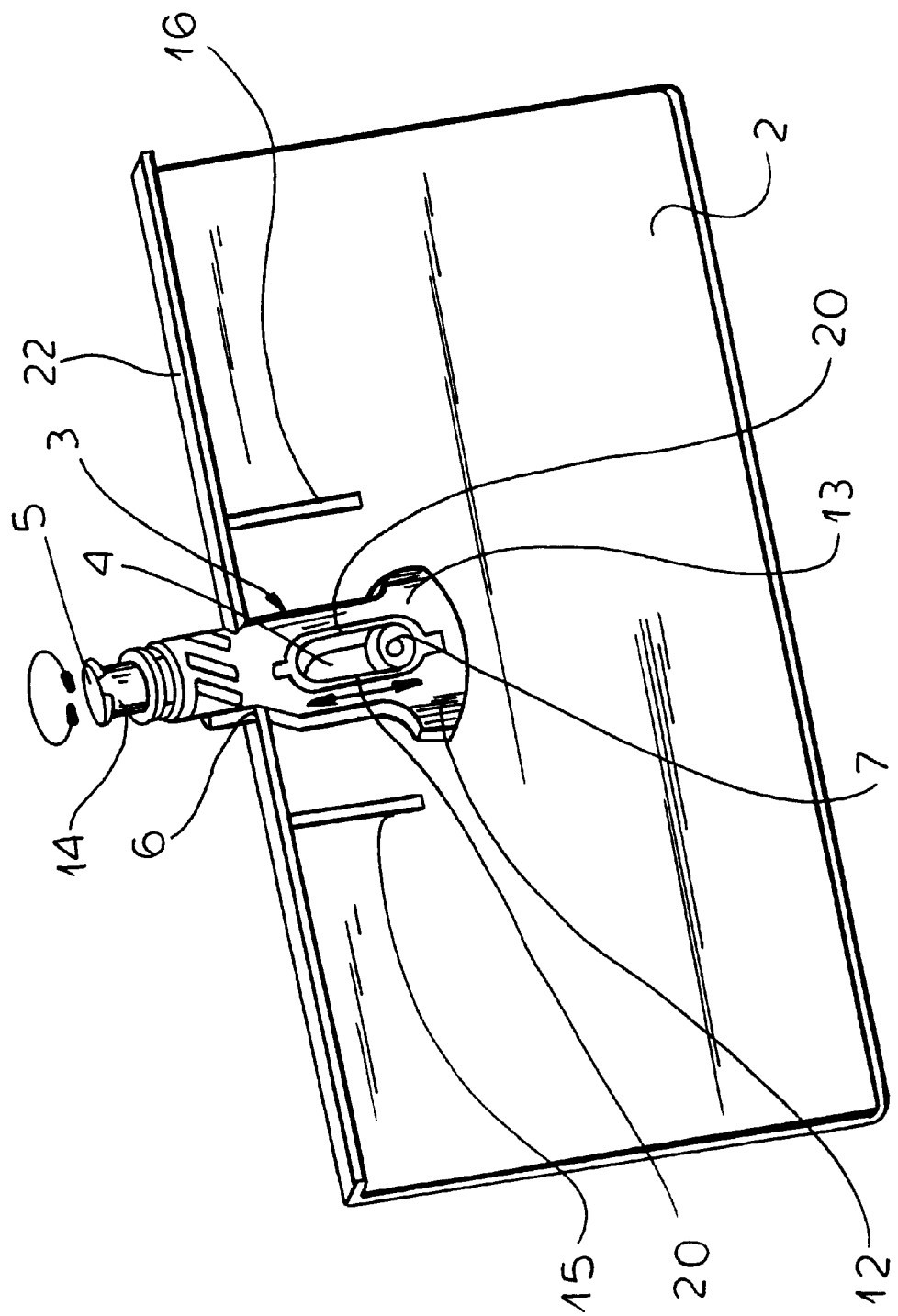
FIG. 2 is a view of the movable frame part of the mount.
Figure 3:
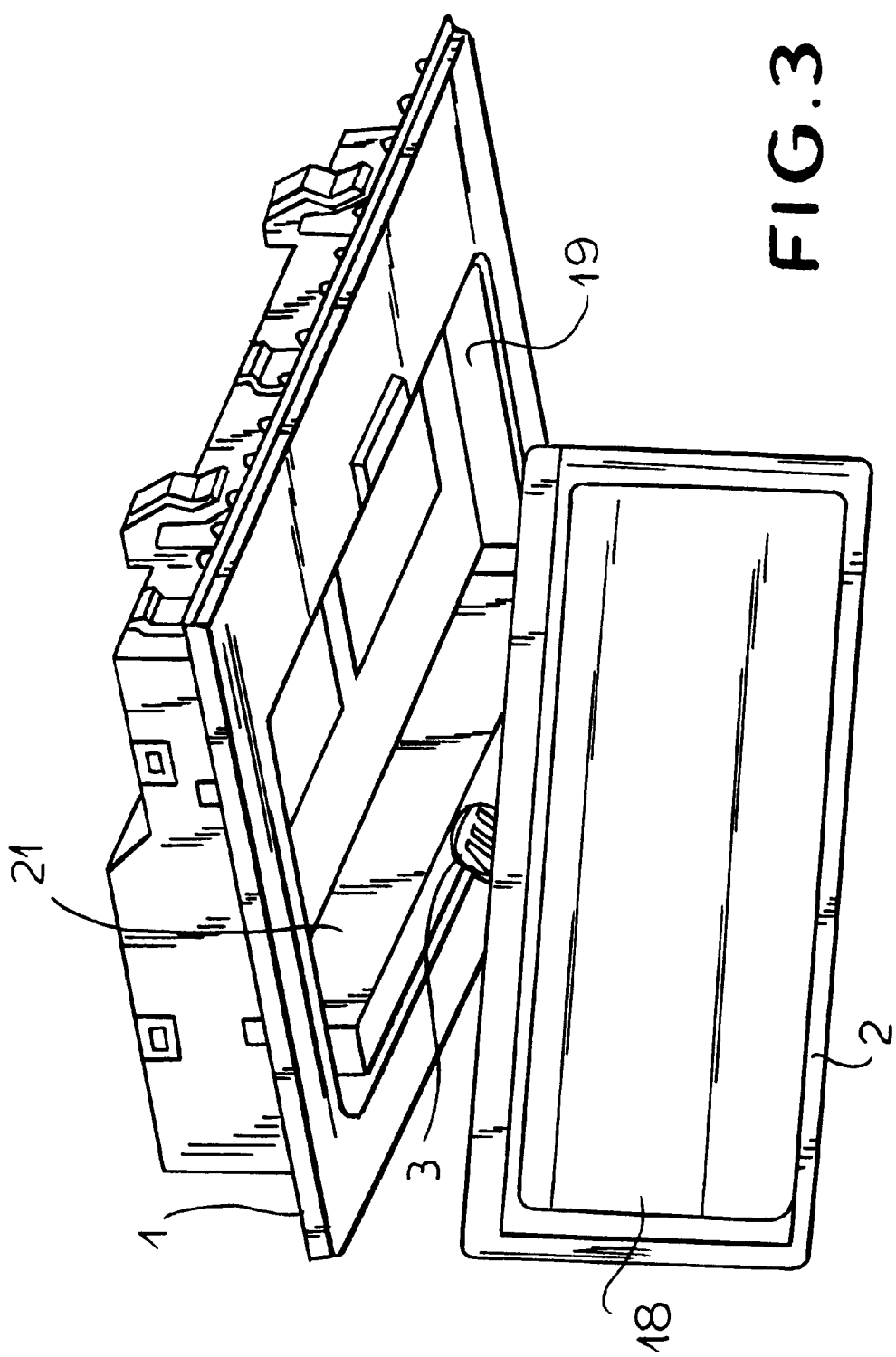
FIG. 3 is a perspective view of the entire mount assembly.

As seen in FIGS. 1 through 3 a fixed outer frame 1 adapted to be mounted in the roof or ceiling of a motor vehicle flush with the head liner is basically rectangular and forms a downwardly open cavity 19 of rectangular outline. A movable inner frame 2 secured by a connector 3 to the frame 1 is of rectangular shape to fit in the recess 19 and is adapted to carry a mirror or flat-panel monitor 18.

The frame 1 includes a straight side member 21 that extends along a front edge of the recess 19 and that is adapted to pivot about a horizontal first axis 9 extending transverse to the vehicle's travel direction. The connector 3 acts as a swivel and has a metallic shaft 14 and enlarged head 5 received in a hole 8 of the member 21 so that the inner frame 2 can also pivot about a second axis 10 which is perpendicular to and traverses the axis 9 and which is the center axis of the shaft 14. This connector 3 also is unitarily formed with a flat body formed in turn with a slot 4 that is elongated parallel to the axis 10 and that is traversed by a screw 7 seated in the frame 2 so that the entire frame 2 can also be slid parallel to the axis 10 on the connector 3. Edges of the slot 4 are roughened at 20 so that a head of the screw 7 has some friction with the connector 3 so that the screw 7 sits stably in any position along the slot 4.

In addition the entire frame 2 can pivot limitedly about a third axis 11 of the screw 7, which axis 11 extends perpendicular to and through the axis 10 and perpendicular to a plane defined by the axes 9 and 10. The connector 3 is, except at the shaft 14 and head 5, of flat construction and has a pair of ears 12 and 13 engageable with stops 15 and 16 formed on the frame 2 to limit pivoting about the axis 11. In addition the frame 2 has extending along the member 21 a turned-up edge 22 formed with a notch 6 through which the connector 3 passes with play. The flanks of the notch 6 also act as stops limiting relative angular movement about the axis 11 between the inner frame 2 and the connector 3. Bolts set in the frame 2 could also be used as pivot-restricting stops.

Figure 4:
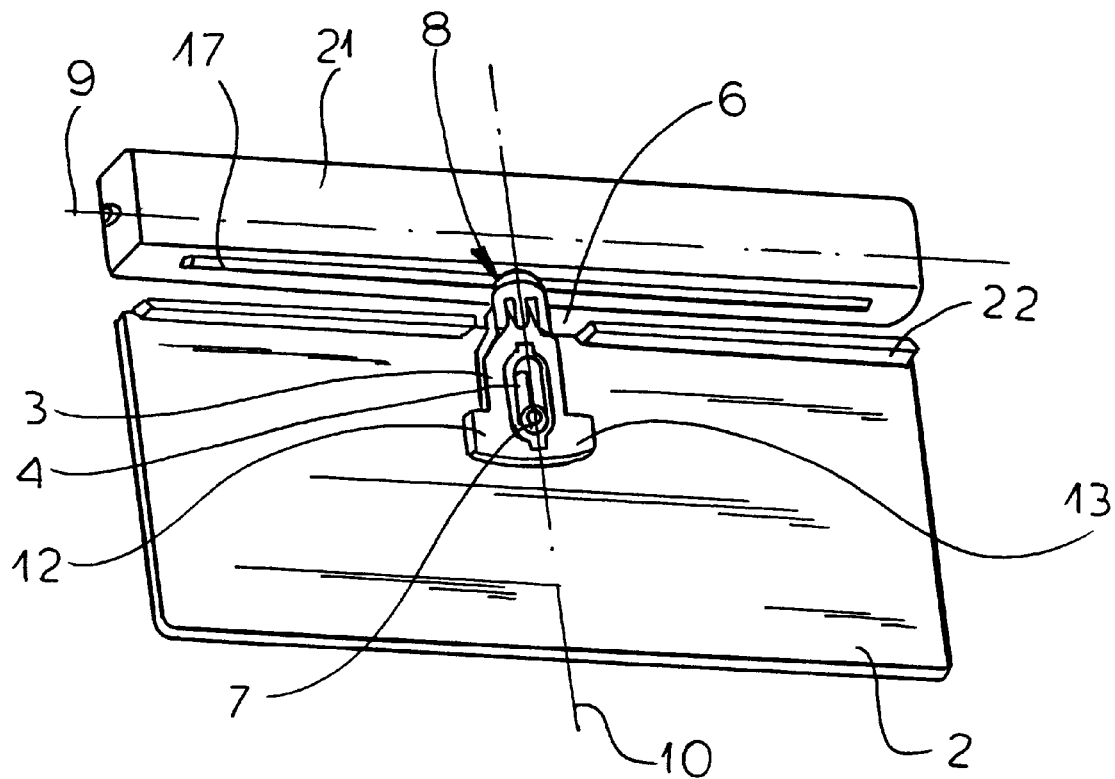
FIG. 4 is a view similar to FIG. 1 showing an alternative structure.

FIG. 4 shows a system where the head 5 and shaft 14 of the connector 3 are received in a narrow-mouth slot 17 extending parallel to the axis 9 and open perpendicular thereto. Thus the entire frame 2 with the connector 3 can be slid along the slot 17, moving parallel to the axis 9.

With this system it is therefore possible to swing the frame 2 down about the first axis 9, then pivot it about the second and third axes 10 and 11 and even slide it along the axis 10. In this manner positioning to any useful orientation is possible.

We claim:

1. In combination with a motor-vehicle roof and a flat mirror or monitor, a mount assembly comprising:

an outer frame fixed in the roof and forming an opening;

a member forming a side of the opening and pivotal in the frame about a horizontal first axis;

an inner frame fittable in the opening adjacent the member and carrying the flat mirror or monitor;

a connector pivotal in the member about a second axis transverse to the first axis;

means including a slide joint securing the connector to the inner frame for movement of the inner frame parallel to the transverse second axis on the connector; and means including a pivot joint securing the connector to the inner frame for movement of the inner frame on the connector about a third axis transverse to the second axis and to a plane formed by the first and second axes, the pivot joint including a transverse hole through the connector and a screw seated in the inner frame and extending along the third axis through the hole.

2. The motor-vehicle mount assembly defined in claim 1 wherein the slide joint includes a slot formed in the connector and extending generally parallel to the first axis and a screw seated in the movable frame and extending transversely through the slot.

3. The motor-vehicle mount assembly defined in claim 2 wherein edges of the slot are roughened for frictional engagement with a head of the screw.

4. The motor-vehicle mount assembly defined in claim 1 wherein the member is formed with a hole centered on the second axis and receiving a head of the connector.

5. The motor-vehicle mount assembly defined in claim 4 wherein the hole is a slot elongated parallel to the first axis and slidably receiving the connector, whereby the inner frame can move parallel to the first axis relative to the member and outer frame.

6. The motor-vehicle mount assembly defined in claim 1 wherein the inner frame is formed with an edge slot through which the connector passes.

7. The motor-vehicle mount assembly defined in claim 1 wherein the connector is formed with side edges and the inner frame has formations engageable with the side edges for limiting pivoting of the inner frame about the third axis on the connector.

8. The motor-vehicle mount assembly defined in claim 7 wherein the connector has a T-shaped part with arms forming the side edges.

9. The motor-vehicle mount assembly defined in claim 8 wherein the T-shaped part is between the mirror or monitor and the inner frame.

\* \* \* \* \*